Patented June 4, 1946

2,401,445

UNITED STATES PATENT OFFICE 2,401,445

POLYMERIZATION OF VINYL ACETATE

Jesse Oris White, Arlington, N. J., assignor to E. I. du Pont de Nemours & Company, Wilmington, Del., a corporation of Delaware No Drawing. Application July 13, 1943, Serial No. 494,510

9 Claims. (Cl. 260—9)

This invention relates to the polymerization of vinyl acetate and, more particularly, to the polymerization of vinyl acetate while dispersed in an aqueous medium.

The so-called "granular polymerization" of liquid monomers, as described in Crawford et al. U. S. Patent 2,108,044, comprises subjecting the monomer to polymerizing conditions while suspended in the form of droplets in a non-solvent medium, commonly an aqueous medium. This process, when properly conducted, produces polymer in the form of small globules. The maintenance of the monomeric liquid in the form of droplets is accomplished by the combined influences of various agitation and a dispersing agent.

Various dispersing agents have been proposed for this purpose. For satisfactory service, a granulating agent must not merely be effective as such, but also must be easy to prepare and introduce into the reaction batch, and either readily removed from the particles of polymer, on which it becomes adsorbed, or else unobjectionable if not removed from it.

The use of starch as a dispersing agent in a process of this type has been suggested in the above mentioned patent, but this patent, although noting that the dispersing powers of a starch depend on its past history, is silent with respect to the basis for selection of a starch for optimum performance. Furthermore, the method disclosed therein for the preparation and use of the starch presents certain practical difficulties.

In accordance with that patent a solution of the starch is prepared in advance of its use. This necessarily adds to the process of polymerization an ancillary step. Furthermore, in actual practice the solution of starch cannot be made up in advance in large batches, because starch solutions tend, upon standing, to be spoiled by action of molds or bacteria, and because it is not practicable to use preservatives for the inhibition of such action since a preservative is likely to interfere with the desired progress of polymerization of the monomer. The necessity of limiting the size of batches of starch solution to what can be used up before it spoils adds, of course, to the cost of the dispersing agent used per pound of polymer produced.

The polymerization of liquid monomers by the general method just described involves regularly the use of a catalyst, in an amount so selected as to promote the polymerization at an economical rate and at the same time to exercise some control upon the size of the macromolecules developed by the polymerization. The most usual catalyst is benzoyl peroxide but it is not altogether a satisfactory one since not only is it expensive and somewhat hazardous, but also, it is a source of discoloration in the resulting polymer. Hydrogen peroxide is free from these objectionable characteristics but it has been found to be a comparatively weak catalyst when used alone. Admixture, with hydrogen peroxide, of a small proportion of benzoyl peroxide has been shown by Marks U. S. Patent 2,109,595, to increase in surprising measure the activity of hydrogen peroxide as a catalyst of polymerization, but the complete exclusion of benzoyl peroxide is nevertheless desirable.

An object of the present invention is to provide improvements in the polymerization of vinyl acetate in suspension in an aqueous vehicle by the general method of said U. S. Patent 2,108,044, i. e., the method of so-called granular polymerization. More specifically, the invention relates to improvements in the selection and manner of use of starch as a dispersing agent in this process, and to the provision of a feasible technique for the use of hydrogen peroxide as the sole added catalyst of polymerization.

A specific object of the invention is to make unnecessary the ancillary step of putting the starch into solution in advance of adding it to the other ingredients of the polymerization batch. Another object is the preparation of granular polyvinyl acetate of desirable and uniform particle size. Other objects will be apparent from the description of the invention given hereinafter.

In accordance with the present invention, the above objects are accomplished by a process which comprises heating under agitation a mixture comprising monomeric vinyl acetate, water as vehicle, hydrogen peroxide as catalyst of polymerization, a water-soluble alkaline substance in quantity to provide and maintain a pH between 4.9 and 3.8 in the mixture during the process and, as dispersing agent, a requisite quantity, between 0.05% and 0.25%, by weight of the monomer, of a starch of viscosiy hereinafer specified. In a preferred embodiment of the process, the monomer is heated to about 50° C., to it are added the starch, in dry comminuted form, and dry sodium bicarbonate, or other water-soluble alkaline substance, then water at 75° C.–85° C. and finally hydrogen perioxide; the temperature of the mixture is raised by heat applied and by the heat developed in the resulting polymerization of the vinyl acetate, until it reaches about 92° C.

To be acceptable for use as granulating agent in this process, the starch must exert an adequate granulating or dispersing effect to supplement the dispersing effect of the agitation in opposition to the tendency of the suspended material to coalesce in the course of its polymerization. At the beginning of the process, when the vinyl acetate exists still as a mobile liquid, and again at the end of the process, when it has been converted practically completely into polymer, the suspension can be adequately maintained by means of agitation alone, at least in any reasonably well designed equipment operated at suitable speed. But during the intermediate stages of the polymerization the partially polymerized vinyl acetate is relatively adhesive and the globules of it tend to coalesce and to adhere to the equipment. It is during this stage that the dispersing influence of a granulating agent must be provided to supplement the agitation in preventing such coalescence and adherence. In the course of the rise in temperature during the process, which accompanies the progressive polymerization, a temperature, or range of temperature, is reached at which the tendency of the globules to coalesce is at its strongest. This temperature, or range of temperature, is designated herein, for convenience of reference, the "temperature of maximum adhesiveness"; for vinyl acetate it has a characteristic and fairly definite value of 67° C–70° C.

According to the present invention, the criterion of acceptability of a starch for use as granulating agent is that, under specific conditions of test, presently to be described, a solution of not more than one per cent of it in water exhibits a viscosity of not less than 10 millipoises after having been heated for 15 minutes at the temperature of maximum adhesiveness of monomeric vinyl acetate, and also after having been heated for 120 minutes at this temperature.

In characterizing the starches which are operative in the present invention, the term "viscosity" is used herein, as a matter of convenience in language, to designate a property of solutions of starch in which viscosity in the strict sense of the word is complicated by at least one other factor. Starches are not homogeneous in structure or behavior, in that each granule is made up of a relatively insoluble capsule (amylopectin) and its relatively soluble contents (amylose). At the temperatures of use of starch in this invention, the material of the interior of the granule is readily soluble in water and, once it is released upon the swelling and bursting of the capsules, this material goes smoothly into solution. The material of the capsule, however, is merely swollen and gelled, and persists as fragments suspended in the solution. In a viscosimeter these fragments in suspension contribute to the reading of what is designated as viscosity. And because these fragments are fragile and become subdivided by agitation of the solution, the magnitude of their influence upon the viscosity depends in part upon the manner in which the solution has been prepared.

Accordingly, it is necessary that the viscosity of a starch, for the purposes of describing the invention, be defined in terms of the apparent viscosity of a solution of it prepared in a specific manner and measured in a specific manner in a specific viscosimeter.

A starch for use in the present invention is tested as follows:

The instrument used is the Mac Michael viscosimeter, as described in bulletin No. 560 of Eimer and Amend, New York city.

Into the outer cup of this instrument is placed 120 cc. of water, and the inner cup (No. 32,788c) is inserted. The cylindrical plunger of 1 cm. diameter (No. 32,788f) is suspended by the wire of gauge No. 34 B. and S., the instrument is levelled, the pointer is adjusted to zero, and the cover is put into place. The water in the outer cup is heated to 161.5° F. (±1° F.) and maintained at that temperature by suitable adjustment of a voltage-regulator in the line supplying current to the heater.

An accurately weighed sample of the starch (2.02 grams, dry basis) is slurried in exactly 20 grams of water at 28° C. in a 400 cc. beaker, and to this suspension there is added rapidly, with a minimum of agitation, 180 grams of water at 80° C.

The cover of the viscosimeter is removed, and the mixture of starch and water is poured into the inner cup, up to the second graduation on the plunger. Immediately the cover is replaced, the platform is set into rotation at 42 R. P. M. and a stopwatch is started.

The temperature of the liquid is now about 69° C. It is maintained at 69° C.±0.5° C. through the determination by maintaining the temperature of the water in the outer cup at this temperature.

The viscosity of the liquid at any time is read in "degrees M" on the graduated disc. Previous calibration of the instrument with liquids of accurately known viscosities makes it possible to convert "degrees M" to millipoises (mp.).

In testing a starch for suitability for use in this invention, a reading of viscosity is made at 15 minutes after the start. If the viscosity is too low at this time, the determination may be discontinued and the starch rejected as unsuitable. If the viscosity at 15 minutes is above the required minimum, then the test is continued. If at the end of 105 minutes additional (120 minutes total) the reading is still above the required minimum, the starch is acceptable. If before that time the reading falls below the required minimum, the test may be stopped, and the starch rejected.

If, on the other hand, the one per cent solution of a starch, made up as described, is too "viscous" or jellylike to be handled satisfactorily by the test apparatus, then a less concentrated solution may be used instead and, if this latter passes the test at both points of time, the starch is obviously acceptable as being of well over minimum acceptable viscosity and behavior.

The failure of a starch to pass this test may be due to deficiency in one or both of the factors which contribute viscosity, i. e. to deficiency in the inherent viscosity of the relatively easily soluble amylose, to failure of the amylopectin to be effectively gelatinized at the temperature of the test, to excessive fragility of the gelatinized amylopectin, or to a combination of these deficiencies. Thus a starch of which the amylopectin fails to gel adequately at 69° C. is not satisfacory, even though it may become well gelatinized at a somewhat higher temperature, for it is at or near this temperature of maximum adhesiveness of vinyl acetate that its granulating effect is required. And failure of a starch to hold its viscosity above the set minimum in the two hours of gentle agitation in the test apparatus is evidence that the gelatinized amylopectin is too fragile to maintain the viscosity of the starch under the more vigorous agitation encountered in the commercial reaction of polymerization.

As has been pointed out in the aforementioned U. S. Patent 2,108,044, the amount of dispersing agent should be, on the one hand, adequate to supplement the dispersing effect of the agitation provided, so as to prevent coalescence of the dispersed globules during the polymerization, but also should be, on the other hand, not so great as to make the dispersed globules objectionably small. Other factors being constant, the amount used of a given dispersing agent serves to control the size of the particles of the polymer produced. The amount to be used of a given starch will be selected on that basis and will ordinarily be not more than about 0.25 per cent of the weight of the monomer nor less than 0.05 per cent. More frequently, when the starch is of really superior type, the amount will be of the order of 0.08 to 0.2 per cent of the weight of the monomer, preferably between 0.10 and 0.15 per cent. The selection of the precise optimum amount must be based upon accumulated experience and specific trials, since various factors must be taken into account.

In general, the more effective the agitation of the mixture of monomer and aqueous vehicle, the less will be the amount of starch needed to supplement the agitation itself in maintaining the monomer suspended in droplets of desired size in the vehicle. Thus the design of the reaction kettle and its agitator, and the speed of the latter, will influence the amount of starch to be used. The greater the ratio of aqueous vehicle to suspended monomer, the less is the amount of starch required to supplement the effect of agitation in keeping the monomer in suspension. The type of polymer being made is also a factor, in that when polymer of low viscosity is being made the globules of monomer in the course of being converted into granules of polymer remain longer in a soft and sticky condition, which promotes their coalescence, than is the case in the manufacture of polymer of higher viscosity. Finally, of course, the amount of starch required depends inversely upon the viscosity of the starch selected for use.

The viscosity characteristics of a starch constitute the only criterion of its suitability, other than that it be free from objectionable contaminants. The source of the starch is immaterial. For example, cornstarch, tapioca starch, potato starch, and others have been used with success, as has also methyl starch. As will be seen, the process of the invention serves to gelatinize and dissolve the raw starch.

The water-soluble alkaline substance, serves two purposes, namely, (1) to promote the solubilization of the starch, and thus to render it effective as a granulating agent, and (2) to provide a pH which is favorable to the polymerization under the catalytic influence of the hydrogen peroxide. The amount of alkaline substance to be used is such as to develop and maintain in the aqueous vehicle a pH between about 3.8 and 4.9. Sodium bicarbonate, sodium phosphate, and sodium hydroxide are convenient substances to use for this purpose but obviously other alkaline substances can be employed.

In the absence of the added alkaline substance, the system would be more strongly acid than this, by reason of hydrolysis of the vinyl acetate both before and during polymerization. This acidity must be reduced in order to promote the polymerization, because hydrogen peroxide does not function effectively as a catalyst at a pH below about 3.8. On the other hand, the pH should be kept below about 4.9 in order to avoid excessive hydrolysis of the vinyl acetate.

If the amount of alkaline substance added is sufficient to bring the pH at the start into the upper part of the range 3.8–4.9, the pH will ordinarily remain within the range throughout the reaction of polymerization despite the release of some acidity by hydrolysis of vinyl acetate, and a further addition of alkaline substance will not be needed.

The following examples, wherein all proportions are given by weight unless otherwise stated, illustrate specific embodiments of the invention.

Example I

The following ingredients are used:

| | Parts |
|---|---|
| Vinyl acetate monomer | 100 |
| Water | 131 |
| Aqueous hydrogen peroxide (27.56% by weight) | 0.23 |
| Sodium bicarbonate | 0.13 |
| Potato starch | 0.35 |

In the viscosity test described above, an 0.34% solution of this starch gives a reading of 15.5 M. P. at 15 minutes and a reading of 21.5 M. P. at 120 minutes. A one per cent solution would, of course, give still higher readings.

The vinyl acetate is introduced into a stainless-steel kettle provided with an agitator, reflux condenser, and jacket for heating by steam or hot water. The vinyl acetate is heated to about 50° C. and then the starch and sodium bicarbonate are added, dry, and stirred with it to a slurry. To this slurry is now added the water, which has been preheated to about 80° C. Then the hydrogen peroxide is added. With agitation continuing, the mixture is heated until refluxing begins, at about 66° C. When the temperature of the charge reaches about 92° C., after about 52 minutes, the reaction is considered to be complete. The pH of the aqueous vehicle is slightly below 4.85 at the start of the reaction, and falls not below 3.8 at its conclusion.

The liquid monomeric vinyl acetate, suspended in droplets in the aqueous vehicle by action of the agitation and the dispersing agent, has been converted into solid globules of polyvinyl acetate, of substantially uniform size.

The polyvinyl acetate thus made carries adsorbed starch, which is removed or not according to the purpose for which the polyvinyl acetate is to be used. If the polyvinyl acetate is to be converted into a polyvinyl acetal resin, the starch will be destroyed in the natural course of the reactions involved in this conversion, and there is therefore no need to remove it from the granules of polyvinyl acetate. However, if the starch is not to be removed, it is advisable to add a lubricant before the isolation of the resin from the aqueous slurry, as shown in Example IV. If, on the other hand, the polyvinyl acetate is to be used as such, and if the slight haziness contributed by the starch will be found objectionable, then the granules of polyvinyl acetate are freed from starch by a treatment with a suitable detergent, such as a fatty alcohol sulfate, before being washed and dried.

Example II

The following ingredients are handled in the same manner as were those of Example I.

| | Parts |
|---|---|
| Vinyl acetate | 100 |
| Water | 100 |
| Hydrogen peroxide (aqueous solution 27.56% by weight) | 0.4 |
| Potato starch | 0.4 |
| Sodium bicarbonate | 0.1 |

This starch is the same as that used in Example I.

The pH is within the same stated range throughout the reaction of polymerization.

Example III

The following ingredients are handled in the same manner as were those of Example I.

| | Parts |
|---|---|
| Vinyl acetate | 100 |
| Water | 200 |
| Hydrogen peroxide (aqueous solution 27.56% by weight) | 0.3 |
| Sodium bicarbonate | 0.13 |
| Sando tapioca starch | 0.5 |

In the viscosity test, a 0.88% solution of this starch gives readings of 14.8 and 17.5 M. P. at 15 and 120 minutes, respectively.

Example IV

A glass lined reaction vessel equipped with an efficient stirrer is charged with 120 parts of monomeric vinyl acetate. While this material is gently agitated, 0.12 part of sodium bicarbonate followed by 0.3 part of starch are added. These ingredients are allowed to admix for five minutes after which 135.5 parts of water followed by 0.3 part of hydrogen peroxide (27.56% aqueous solution) are introduced into the reaction mixture. The entire mixture is then heated to reflux by the circulation of steam in an external heating jacket. Gentle refluxing is allowed to continue for 45 minutes by supplying external heating as necessary. As the reaction mixture continues to reflux, the temperature gradually rises from about 60° C. to a peak temperature of about 96° C. When the temperature of the reaction mixture is at 80° C., 0.24 part of sorbitan monopalmitate are admixed with reaction mixture. After the mixture is refluxed for the 45 minutes, the temperature is adjusted to 90° C. and maintained at this value for 10 minutes. The mixture is then cooled to 20° C. and the polymeric vinyl acetate is isolated as satisfactory granules of substantially uniform size by centrifuging the slurry.

In the indicated viscosity test, a 0.34% solution in water of the starch used in this example possessed a viscosity of 12.5 M. P. and 17.0 M. P. at 15 minutes and 120 minutes respectively.

The sorbitan monopalmitate employed in this example serves to lubricate the particles to polymeric vinyl acetate during the steps of isolating the resin from the aqueous slurry. Other materials may be employed for this purpose. The long chain fatty acid partial esters of hexitol anhydrides and the polyoxyalkene derivatives of hexitol anhydride have been found especially useful for this purpose.

It will be understood that the above examples are merely illustrative and that in its broad phase the invention comprises heating under agitation a mixture of vinyl acetate monomer, water as a vehicle, a polymerization catalyst, a water-soluble alkaline substance in quantity to provide and maintain throughout the reaction a pH between 4.9 and 3.8 in the mixture, and, as a dispersing agent a starch having viscosity characteristics such that a solution of 1%, by weight, of the starch in water has a viscosity of not less than 10 millipoises after having been heated for 15 minutes at approximately 67° C.–70° C. and also after having been heated for 120 minutes at that temperature.

In carrying out the invention in its preferred form both the liquid monomer and the water are pre-heated. The starch, in finely divided form, is added in dry condition to the liquid monomer maintained at a temperature of 45° C.–55° C. in the reaction vessel and the mixture is thoroughly stirred to distribute the starch in suspension. There is then added, with stirring, the amount of water at 75° C.–80° C. required to constitute the aqueous vehicle; the amount of water can be varied widely but normally is at least equal in weight to the monomer. An alkalizing agent such as sodium bicarbonate is introduced either with the starch or with the water, and the catalyst is introduced in any convenient manner. The starch becomes converted into a water-soluble product which serves as the dispersing agent and this, together with continuous active agitation, keeps the liquid monomer suspended in droplets in the aqueous vehicle. The joint action of heat and catalyst gradually effect the polymerization whereby the droplets of liquid monomer are converted into globules of polymer. The reaction vessel is provided with a reflux condenser to prevent loss of monomer by volatilization. Alternatively, the starch may be introduced into the water instead of into the monomer but the water should not be hot enough to cause gellation of the starch which would result in its becoming lumpy. Slurrying the starch with the monomer, as in the preferred procedure, provides a uniform distribution of it and guards against its lumping when it becomes gelled after contact with the hot water.

Obviously, it is preferred to use hydrogen peroxide as the polymerization catalyst since one of the advantages of this invention is that it permits hydrogen peroxide to be used effectively. However, other polymerization catalysts such as benzoyl peroxide and the like may be used if desired. The proportion of catalyst is not critical although the amount of hydrogen peroxide will usually be between 0.04% and 4.0%, by weight of the monomer.

An advantage of the present invention is that it provides an improved method for using starch as the dispersing agent in the granular polymerization of vinyl acetate. Further, it provides a means for the selection of a satisfactory starch for the purpose and a procedure which makes unnecessary the heretofore necessary and undesirable step of preparing the solution of starch in advance. Further, the invention provides a procedure for effectively using hydrogen peroxide as the polymerization catalyst; while hydrogen peroxide has heretofore been recognized as desirable because of its absence of bad effect on color of the resulting monomer, it has seldom been used because of its weakness as a catalyst. A further and important specific advantage of the invention, resulting from its effective use of starch as a granulating agent, is the unusual uniformity of the size and shape of the granules of the polymerized product. Such uniformity is of great value in commercial operations such as centrifuging, drying, and dissolving the polymer.

As many apparently widely different embodiments of this invention may be made without departing from the spirit and scope thereof, it is to be understood that the invention is not limited to the specific embodiments thereof except as defined in the appended claims.

I claim:

1. Process of polymerizing vinyl acetate which comprises heating under agitation a mixture of vinyl acetate monomer, water as a vehicle, a peroxide polymerization catalyst, a water-soluble alkaline substance in quantity to provide and maintain a pH between 4.9 and 3.8 in the mixture and, as a dispersing agent, a starch having viscosity characteristics such that a solution of 1%, by weight, of said starch in water has a viscosity of not less than 10 millipoises after having been heated for 15 minutes at approximately 69° C. and also after having been heated for 120 minutes at that temperature.

2. Process of polymerizing vinyl acetate which comprises heating under agitation a mixture of vinyl acetate monomer, water as a vehicle, a peroxide polymerization catalyst, a water soluble alkaline substance in quantity to provide and maintain a pH between 4.9 and 3.8 in the mixture and, as a dispersing agent, between 0.05% and 0.25%, by weight of said monomer, of a starch having viscosity characteristics such that a solution of 1%, by weight, of said starch in water has a viscosity of not less than 10 millipoises after having been heated for 15 minutes at approximately 69° C. and also after having been heated for 120 minutes at that temperature.

3. Process of polymerizing vinyl acetate which comprises heating under agitation a mixture of vinyl acetate monomer, water as a vehicle, hydrogen peroxide as a polymerization catalyst, a water-soluble alkaline substance in quantity to provide and maintain a pH between 4.9 and 3.8 in the mixture and, as a dispersing agent, between 0.05% and 0.25%, by weight of said monomer, of a starch having viscosity characteristics such that a solution of 1%, by weight, of said starch in water has a viscosity of not less than 10 millipoises after having been heated for 15 minutes at approximately 69° C. and also after having been heated for 120 minutes at that temperature.

4. Process of polymerizing vinyl acetate which comprises heating vinyl acetate monomer, adding thereto with stirring between 0.05% and 0.25%, by weight thereof, of a dry comminuted starch having viscosity characteristics such that a solution of 1%, by weight, of said starch in water has a viscosity of not less than 10 millipoises after having been heated for 15 minutes at approximately 69° C. and also after having been heated for 120 minutes at that temperature, and a dry comminuted water-soluble alkaline substance, then adding thereto water at elevated temperature in an amount at least equal to the weight of said monomer, and finally hydrogen peroxide in catalytic amounts, and heating the resulting mixture under active agitation until polymerization of said vinyl acetate is substantially complete, the water-soluble alkaline substance being so apportioned that the pH of the water phase of the reaction mixture is maintained between 4.9 and 3.8 throughout the period of heating.

5. Process of polymerizing vinyl acetate which comprises heating vinyl acetate monomer to 45° C.–55° C., adding thereto with stirring between 0.05% and 0.25%, by weight thereof, of a dry comminuted starch having viscosity characteristics such that a solution of 1%, by weight, of said starch in water has a viscosity of not less than 10 millipoises after having been heated for 15 minutes at approximately 69° C. and also after having been heated for 120 minutes at that temperature, and a dry comminuted water-soluble alkaline substance, then adding thereto water at 75° C.–85° C. in an amount at least equal to the weight of said monomer, and finally hydrogen peroxide in catalytic amounts, and heating the resulting mixture under active agitation until polymerization of said vinyl acetate is substantially complete, the water-soluble alkaline substance being so apportioned that the pH of the water phase of the reaction mixture is maintained between 4.9 and 3.8 throughout the period of heating.

6. Process of polymerizing vinyl acetate which comprises heating vinyl acetate monomer to 45° C.–55° C., adding thereto with stirring between 0.05% and 0.25%, by weight thereof, of a dry comminuted starch having viscosity characteristics such that a solution of 1%, by weight, of said starch in water has a viscosity of not less than 10 millipoises after having been heated for 15 minutes at approximately 69° C. and also after having been heated for 120 minutes at that temperature, and dry comminuted sodium bicarbonate, then adding thereto water at 75° C.–85° C. in an amount at least equal to the weight of said monomer, and finally hydrogen peroxide in catalytic amounts, and heating the resulting mixture under active agitation until polymerization of said vinyl acetate is substantially complete, the sodium bicarbonate being so apportioned that the pH of the water phase of the reaction mixture is maintained between 4.9 and 3.8 throughout the period of heating.

7. Process of polymerizing vinyl acetate which comprises heating under agitation a mixture of vinyl acetate monomer, water as a vehicle, a peroxide polymerization catalyst, a water-soluble alkaline substance in quantity to provide and maintain a pH between 4.9 and 3.8 in the mixture, a long chain fatty acid partial ester of a hexitol anhydride as a lubricant, and, as a dispersing agent, a starch having viscosity characteristics such that a solution of 1%, by weight, of said starch in water has a viscosity of not less than 10 millipoises after having been heated for 15 minutes at approximately 69° C. and also after having been heated for 120 minutes at that temperature.

8. Process of polymerizing vinyl acetate which comprises heating under agitation a mixture of vinyl acetate monomer, water as a vehicle, a peroxide polymerization catalyst, a water-soluble alkaline substance in quantity to provide and maintain a pH between 4.9 and 3.8 in the mixture, sorbitan monopalmitate as a lubricant, and, as a dispersing agent, a starch having viscosity characteristics such that a solution of 1%, by weight, of said starch in water has a viscosity of not less than 10 millipoises after having been heated for 15 minutes at approximately 69° C. and also after having been heated for 120 minutes at that temperature.

9. Process of polymerizing vinyl acetate which comprises heating under agitation a mixture of vinyl acetate monomer, water as a vehicle, hydrogen peroxide as a polymerization catalyst, a water-soluble alkaline substance in quantity to provide and maintain a pH between 4.9 and 3.8 in the mixture, a long chain fatty acid partial ester of a hexitol anhydride as a lubricant, and, as a dispersing agent, a starch having viscosity characteristics such that a solution of 1%, by weight, of said starch in water has a viscosity of not less than 10 millipoises after having been heated for 15 minutes at approximately 60° C. and also after having been heated for 120 minutes at that temperature.

JESSE ORIS WHITE.

Certificate of Correction

Patent No. 2,401,445.    JESSE ORIS WHITE    June 4, 1946.

It is hereby certified that errors appear in the printed specification of the above numbered patent requiring correction as follows: Column 1, line 15, for "various" read *vigorous*; column 2, line 41, for "viscosiy" read *viscosity*; line 48, same column for "perioxide" read *peroxide*; column 7, line 49, after the word "particles" strike out "to" and insert instead *of*; and that the said Letters Patent should be read with these corrections therein that the same may conform to the record of the case in the Patent Office.

Signed and sealed this 13th day of August, A. D. 1946.

[SEAL]

LESLIE FRAZER,
*First Assistant Commissioner of Patents.*